United States Patent [19]

Le Tiec et al.

[11] Patent Number: 4,549,646
[45] Date of Patent: Oct. 29, 1985

[54] DEVICE FOR SEPARATION, ORIENTATION, AND POSITIONING OF PARTS GENERALLY FLAT IN SHAPE

[75] Inventors: Patrick Le Tiec, Meudon; Marc Lacroix, Viroflay, both of France

[73] Assignee: Regie Nationale des Usines Renault, Boulogne-Billancourt, France

[21] Appl. No.: 385,828

[22] Filed: Jun. 7, 1982

[30] Foreign Application Priority Data

Jun. 10, 1981 [FR] France ................. 81 11435

[51] Int. Cl.$^4$ ............................................ B65G 47/24
[52] U.S. Cl. ........................... 198/409; 198/463.4 J
[58] Field of Search ............. 198/409, 412, 413, 489, 198/491, 492

[56] References Cited

U.S. PATENT DOCUMENTS

| | | | |
|---|---|---|---|
| 1,936,401 | 11/1933 | Lovely | 29/56 |
| 1,970,023 | 4/1931 | Schroeder | 82/31 |
| 2,664,790 | 12/1949 | Strachan | 409/225 |
| 3,583,576 | 6/1971 | Lakins | 414/748 |
| 3,863,751 | 2/1975 | Vignon | 198/412 |

FOREIGN PATENT DOCUMENTS

| | | |
|---|---|---|
| 1531969 | 1/1970 | Fed. Rep. of Germany . |
| 2383762 | 3/1977 | France . |
| 688533 | 3/1953 | United Kingdom . |
| 1348368 | 3/1974 | United Kingdom . |

Primary Examiner—Joseph E. Valenza
Assistant Examiner—Kyle E. Shane
Attorney, Agent, or Firm—Oblon, Fisher, Spivak, McClelland & Maier

[57] ABSTRACT

A device for separation, orientation, and positioning of parts essentially flat in their general shape, characterized by the fact that the parts are supplied in flat position upon a storage rail and that the device includes, in combination, a tilter which can be activated by a piston between an initial, raised position and a second, tilted position, with the tilter including a support forming a continuation of the storage rail when the tilter is in raised position so as to receive the first of parts from the reserve, with stops arresting the rest of the parts, and with the support further including retaining members (9) for preventing the part from being dislodged, while stop pads stop the first part remaining on the rail during tilting of the tilter.

3 Claims, 3 Drawing Figures

DEVICE FOR SEPARATION, ORIENTATION, AND POSITIONING OF PARTS GENERALLY FLAT IN SHAPE

BACKGROUND OF THE INVENTION

1. Field of the Invention

This invention relates to the feeding, in proper position and orientation, of parts essentially flat in their general shape, particularly transmission shaft dogs, to an automatic machine for welding the dogs onto the shafts.

2. Description of the Prior Art

Dogs are usually conveyed on edge along a vibrating rail to a nonvibrating grip, situated at the end of the rail, which holds a reserve supply of several dogs. The dog lying at the end of the reserve periodically drops down several millimeters to offer resistance to the part-holder of the automatic machine that moves up to grasp it. The grip comprises two retractable retainers which hold the first dog and are pushed away by two fingers on the part-holder as the latter moves up to grasp the dog.

The drawbacks of this technique are, first, the great difficulty of selecting bulk parts from a vibrating bowl in order to send them along the rail on edge. With dogs of certain shapes, automatic selection is impossible and much more sophisticated techniques are required. Moreover, the device is not very reliable and often jams, so that the two retractable retainers do not always hold the dogs effectively, especially at the moment when the parts are to be gripped by the part-holder, with the result that dogs drop out onto the machine platform.

SUMMARY OF THE INVENTION

The object of this invention is to eliminate earlier drawbacks by creating a device that can be supplied with parts set flat on a rail (an opertion which is much easier to perform); that will separate these parts, tilt them on edge, and hold them securely until they can be gripped by the part-holder; and that will be very reliable and easy to produce.

This invention consists in devising a tilter capable of rocking between two extreme positions precisely defined by stops under the effect of an appropriate control such as a piston, with said tilter comprising a support that lies at the end of the supply rail when the tilter is in its first position so as to receive the first part moving along the rail; retaining stops drawn back by a spring into a position in which they will retain the next part on the rail as soon as the tilter leaves its first position; a cam located on the tilter which cooperates with a protrusion on the stops so that the latter are retracted when the tilter is in first position; and finally retractable retaining means affixed to the tilter and comprising fingers under which the first part can slide when the tilter is in first position, and which hold this part against the support in all positions of the tilter, with said retaining means comprising gradients cooperating with fingers on the part-holder to produce the retraction of the retaining fingers when the part is gripped (in the tilter's second position).

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
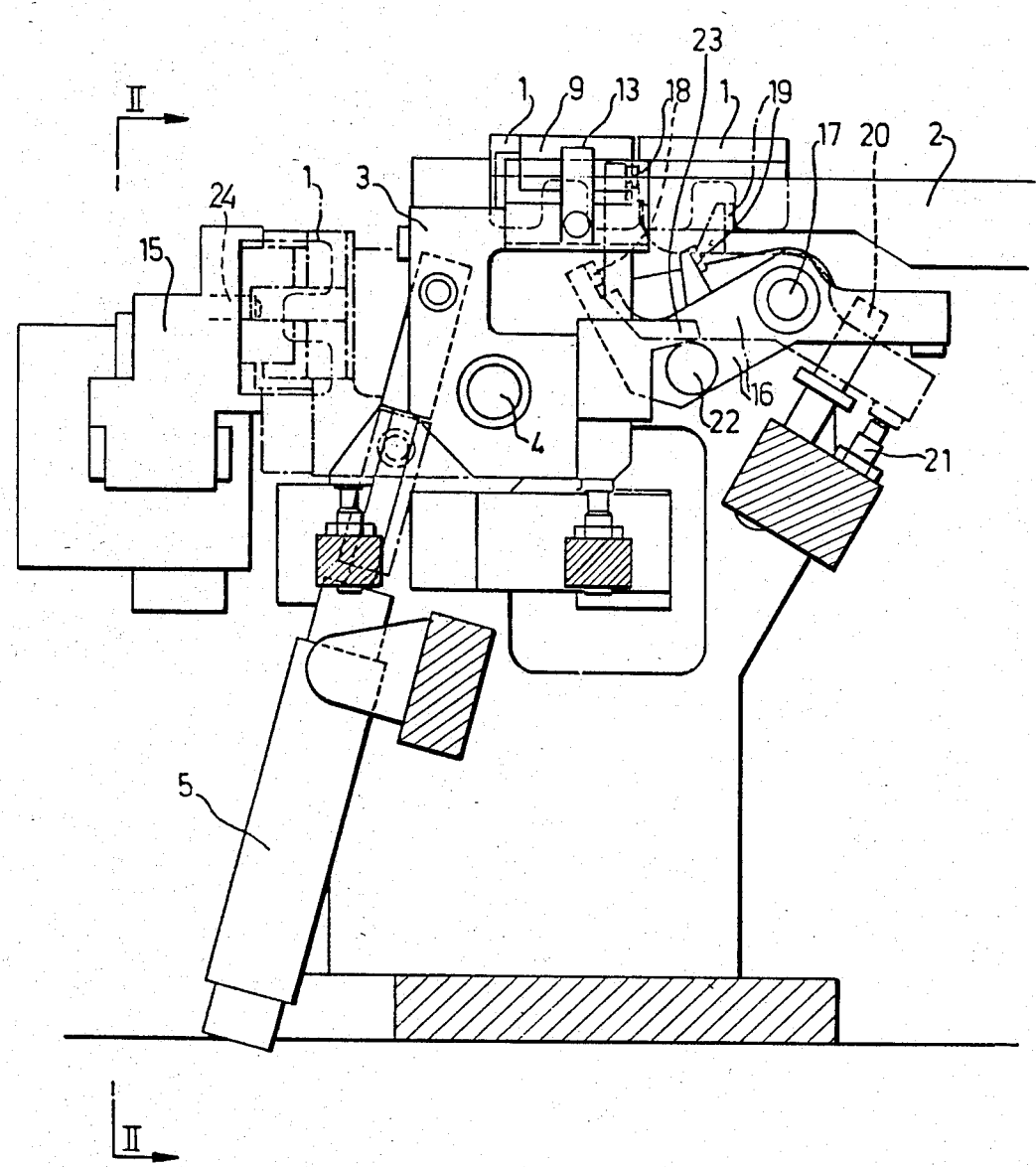
FIG. 1 is a vertical sectional view of the device taken along line I—I of FIG. 2.

The preferred embodiment relates more particularly to the supply of an automatic welding machine with transmission shift rail dogs shaped as shown by reference number 1 in the figures. The dogs 1 are essentially cut and cambered flat parts having the cross-section shown in FIG. 2. The unit comprises first of all a vibrating bowl for receiving these parts in bulk and positioning them on a rail in a continuous line. This assembly, of conventional design, is not shown here. It is much easier to produce than the usual device, which places parts on edge. Thus the dogs 1 arrive side by side in a continuous line upon rail 2. The device comprises a tilter 3 which pivots on a horizontal shaft 4 by action of a piston 5 so as to move from the position shown in the unbroken line in FIG. 1 to the position shown by the dashed line in the same Figure. This tilter comrises a support consisting of first and second parts 6 and 7 which, in the first position of the tilter 3, form a continuation of rail 2 in order to receive the first dogs, with a stop 8 for stopping the feed of succeeding dogs 1.

The tilter 3 is further provided with retaining means 9 comprising two retaining fingers 10 and 11 arranged in such a way that dogs 1 may pass below them and come to a stop against stop 8, while at the same time allowing said fingers 10, 11 to slightly cover dogs at points required to prevent it from escaping during the subsequent tilting motion of the tilter. These points are further selected as a function of the part's shape so that a slight backward motion of the retaining means in the direction of arrow 12 entirely releases the dog 1 and enables it to be drawn perpendicularly to its own principal plane. To this end, retaining means 9 as a whole is slidably mounted on top of tilter 3, and is drawn back in the direction opposite arrow 12 by a return spring 13. Such comprises a gradient 14 sloping in the direction required for producing disengagement of retaining means 9 in the direction of arrow 12, by a pushing action against gradient 14.

This enables the piston to move tilter 3 from a vertical to horizontal position, bringing the first dog 1 along with it, with the latter being unable to escape during this motion. When dog-holder 15 (which forms part of the automatic welding machine) grips this dog 1 in the exact position and orientation to which the tilter 3 has brought it, a finger (24) on said dog-holder 15 pushes against gradient 14 to disengage retaining means 9 and enable dog-holder 15 to grip dog 1 and draw it perpendicularly with respect to its plane, i.e., horizontally, for the new position of the tilter 3.

During the entire tilting process and until the tilter 3 has returned fully to its initial position, the flow of dogs 1 behnd the first dog 1 which has already been pulled out, must be discontinued in order to prevent parts from falling in a disorderly fashion onto the machine.

For this purpose, retractable stopping means are provided consisting of a tilting element 16 pivoting on shaft 17 and comprising two contact pads 18 and 19 which, in the raised position of part 16, come into contact with carefully chosen points on the dog 1 immediately adjacent to the part lying on the support, so as to stop its progress. To this end, tilting element 16 is drawn into a raised position by a return spring 20 and, in this position, comes into contact with an adjustable angular stop 21 which enables the position to be adjusted with precision.

Figure 2:
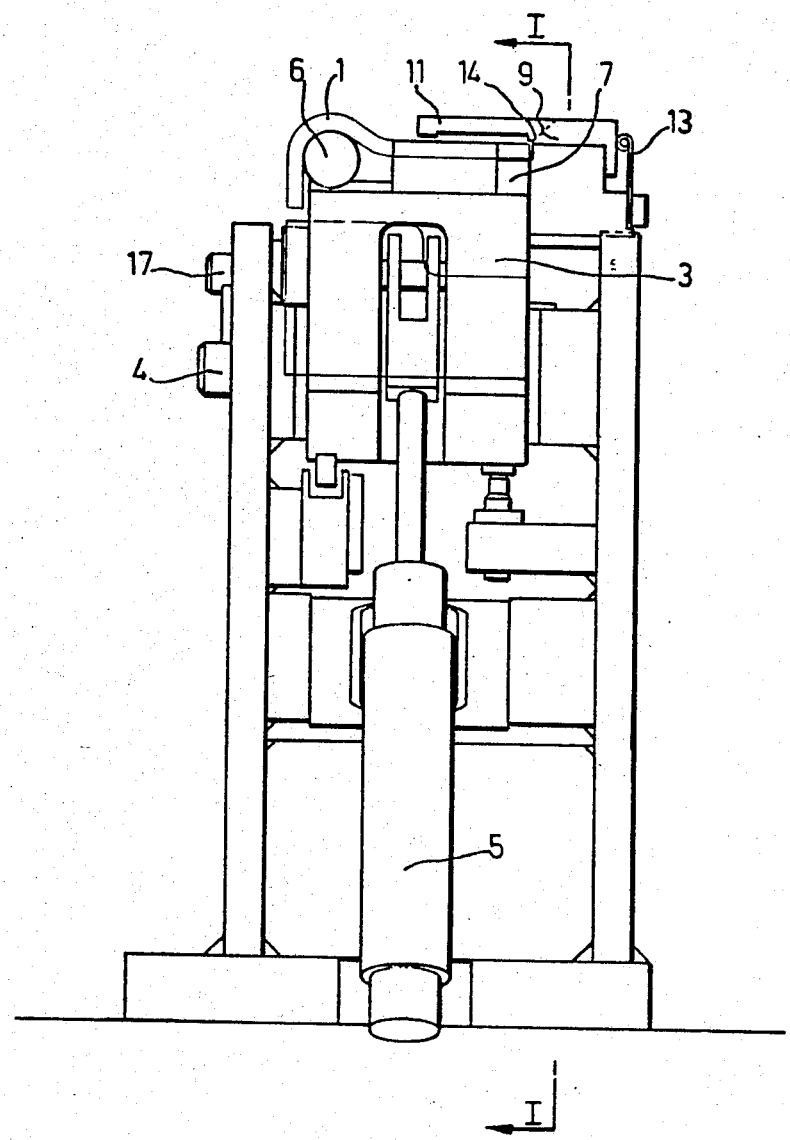
FIG. 2 is an end view taken along line II—II of FIG. 1.
Figure 3:
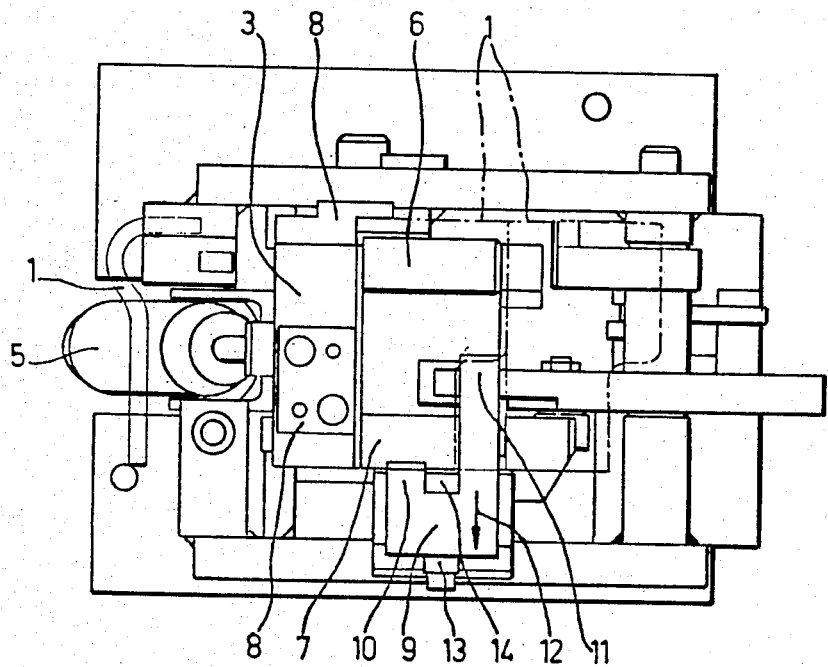
FIG. 3 is a top view of the device.

On the other hand, when the tilter 3 is in its initial position, as shown in FIG. 1, the fingers 10, 11 must be retracted in order to enable the free passage of dogs 1 from rail 2 to support 6, 7. For this purpose, tilting element 16 further comprises a roller 22 functioning as a cam-follower in cooperation with cam 23 on tilter 3 so as to push contact pads 18 and 19 out of active position when tilter 3 is about to reach its first position, as shown in the unbroken line in FIG. 1.

Thus a single piston 5 is enough to separate a dog 1 from the continuous reserve of dogs 1, tilt the dog 1 into different and precise orientations and positions, and hold the dog 1 there until it is gripped by the dog-holder 15, while at the same time holding back reserve dogs 1. All of these motions are thus synchronized by hydraulic or pneumatic piston 5 alone. The entire assembly is particularly simple and reliable, even at high operating speeds. Obviously, numerous modifications and variations of the present invention are possible in light of the above teachings. It is therefore to be understood that within the scope of the appended claims, the invention may be practiced otherwise than as specifically described herein.

We claim:

1. A device for separation, orientation, and positioning of a plurality of parts essentially flat in their general shape, which receives said parts distributed onto a storage rail in a continuous line by an auxiliary device and transfers the parts one by one into exact orientation and position, for being gripped by a part-holder, wherein the parts are supplied in flat position upon said storage rail, said device comprising:

a piston;

tilting means operatively connected to said piston so as to be activated by said piston between an initial, raised position and a second, tilted position, wherein said tilting means further comprises a support forming a continuation of said storage rail in the raised position of the tilting means so as to receive a first part of said plurality of parts, and first stop means for arresting said first part wherein said support further comprises retaining means for preventing one of said plurality of parts situated on said tilting means from becoming dislodged from said tilting means when said tilting means is tilted;

second stop means operably connected to said tilting means and which further comprises a tilting element, a return spring biasing said tilting element in a predetermined direction, and at least one stop pad mounted on said tilting element in an active position for stopping a second part of said plurality of parts on said storage rail upon tilting of said tilting means; and means for disengaging said at least one stop pad from said active position when said tilting means is positioned in said initial, raised position, wherein said retaining means is slidably mounted horizontally and parallel to said support and which further comprises first and second fingers disposed so as to permit said second part of said plurality of parts to pass under said first and second fingers and means for causing movement of said first and second fingers from an initial position covering said first part to a second position releasing said first part and allowing removal of said first part by said part-holder.

2. A device according to claim 1, further comprising spring means for biasing said retaining means to said initial position from said second position wherein said retaining means further comprises a gradient which cooperates with said part-holder so as to produce said slight movement of said tilting means by the effect of the part-holder alone, when the tilting means is in said second tilted position.

3. A device according to claim 1 wherein said at least one stop pad further comprises a first and second separately spaced stop pads and wherein said means for disengaging said at least one stop pad further comprises a cam mounted on said tilting means and a roller mounted on said tilting element acting as a cam follower in cooperation with said cam so as to produce disengagement of said first and second stop pads at the end of travel of said tilting means into said initial raised position.

* * * * *